(12) United States Patent
Gebregergis et al.

(10) Patent No.: US 9,136,785 B2
(45) Date of Patent: Sep. 15, 2015

(54) MOTOR CONTROL SYSTEM TO COMPENSATE FOR TORQUE RIPPLE

(71) Applicants: Abraham Gebregergis, Saginaw, MI (US); Mohammad S. Islam, Saginaw, MI (US); Tomy Sebastian, Saginaw, MI (US); Mazharul H. Chowdhury, Midland, MI (US); Shakil Hossain, Saginaw, MI (US); Ramakrishnan RajaVenkitasubramony, Saginaw, MI (US); Niharika P. Popy, Saginaw, MI (US)

(72) Inventors: Abraham Gebregergis, Saginaw, MI (US); Mohammad S. Islam, Saginaw, MI (US); Tomy Sebastian, Saginaw, MI (US); Mazharul H. Chowdhury, Midland, MI (US); Shakil Hossain, Saginaw, MI (US); Ramakrishnan RajaVenkitasubramony, Saginaw, MI (US); Niharika P. Popy, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 36 days.

(21) Appl. No.: 13/795,578

(22) Filed: Mar. 12, 2013

(65) Prior Publication Data

US 2014/0265961 A1 Sep. 18, 2014

(51) Int. Cl.
*H02K 29/06* (2006.01)
*H02P 6/10* (2006.01)
*H02P 21/00* (2006.01)
*H02P 21/05* (2006.01)
*B62D 5/04* (2006.01)

(52) U.S. Cl.
CPC *H02P 6/10* (2013.01); *B62D 5/046* (2013.01); *H02P 21/0035* (2013.01); *H02P 21/05* (2013.01)

(58) Field of Classification Search
CPC ... H02P 6/10; H02P 21/0035; H02P 29/0038; H02P 21/00; H02P 23/04; H02P 21/05; H02K 29/08
USPC .......... 318/400.23, 400.02, 400.38, 430, 431, 318/432, 433, 434, 480
See application file for complete search history.

(56) References Cited

U.S. PATENT DOCUMENTS

| 4,713,596 A | 12/1987 | Bose |
| 4,733,149 A | 3/1988 | Culberson |

(Continued)

FOREIGN PATENT DOCUMENTS

| CN | 1675099 A | 9/2005 |
| CN | 1741368 A | 3/2006 |

(Continued)

OTHER PUBLICATIONS

F. Briz, et al., "Analysis and Design of Current Regulators Using Complex Vectors", IEEE Industry Applications Society Annual Meeting, New Orleans, Louisiana; Oct. 5-9, 1997, pp. 1504-1511.

(Continued)

*Primary Examiner* — Karen Masih
(74) *Attorney, Agent, or Firm* — Cantor Colburn LLP

(57) ABSTRACT

A motor control system is provided. The motor control system includes a motor having plurality of motor harmonics, and a torque ripple compensation controller in communication with the motor. The torque ripple compensation controller is configured to determine a harmonic ripple current for a corresponding one of the plurality of motor harmonics. The harmonic ripple current is based on a reference q-axis current and a reference d-axis current. The torque ripple compensation controller is configured to add the harmonic ripple current for each of the plurality of motor harmonics together to determine the ripple compensating current.

20 Claims, 3 Drawing Sheets

(56) References Cited

U.S. PATENT DOCUMENTS

| | | | |
|---|---|---|---|
| 5,196,778 A | 3/1993 | Hayashida | |
| 5,223,775 A * | 6/1993 | Mongeau | 318/432 |
| 5,410,234 A | 4/1995 | Shibata et al. | |
| 5,652,495 A | 7/1997 | Narazaki et al. | |
| 5,962,999 A | 10/1999 | Nakamura et al. | |
| 6,152,254 A | 11/2000 | Phillips | |
| 6,161,068 A | 12/2000 | Kurishige et al. | |
| 6,222,334 B1 | 4/2001 | Tamagawa et al. | |
| 6,288,515 B1 | 9/2001 | Hiti et al. | |
| 6,370,459 B1 | 4/2002 | Phillips | |
| 6,465,975 B1 | 10/2002 | Naidu | |
| 6,499,559 B2 | 12/2002 | McCann et al. | |
| 6,605,912 B1 | 8/2003 | Bharadwaj et al. | |
| 6,700,342 B2 | 3/2004 | Hampo et al. | |
| 6,900,607 B2 | 5/2005 | Kleinau et al. | |
| 7,034,493 B2 | 4/2006 | Yoshimoto et al. | |
| 7,071,649 B2 | 7/2006 | Shafer et al. | |
| 7,145,310 B2 | 12/2006 | Ihm et al. | |
| 7,199,549 B2 | 4/2007 | Kleinau et al. | |
| 7,207,412 B2 | 4/2007 | Uryu | |
| 7,394,214 B2 | 7/2008 | Endo et al. | |
| 7,576,506 B2 | 8/2009 | Kleinau et al. | |
| 7,952,308 B2 * | 5/2011 | Schulz et al. | 318/400.23 |
| 8,633,766 B2 | 1/2014 | Khlat et al. | |
| 8,896,244 B2 | 11/2014 | Kleinau | |
| 2002/0175649 A1 | 11/2002 | Reutlinger | |
| 2003/0146041 A1 | 8/2003 | Kanda | |
| 2006/0100766 A1 | 5/2006 | Schwarz et al. | |
| 2007/0043490 A1 | 2/2007 | Yokota et al. | |
| 2007/0046126 A1 | 3/2007 | Sagoo et al. | |
| 2007/0103105 A1 | 5/2007 | Endo et al. | |
| 2008/0167779 A1 * | 7/2008 | Suzuki | 701/42 |
| 2009/0026994 A1 | 1/2009 | Namuduri et al. | |
| 2009/0027000 A1 | 1/2009 | Gallegos-Lopez et al. | |
| 2009/0069979 A1 | 3/2009 | Yamashita et al. | |
| 2009/0114470 A1 | 5/2009 | Shimizu et al. | |
| 2009/0234538 A1 | 9/2009 | Ta et al. | |
| 2009/0267555 A1 | 10/2009 | Schulz et al. | |
| 2010/0153162 A1 | 6/2010 | Tam et al. | |
| 2011/0175556 A1 | 7/2011 | Tobari et al. | |
| 2012/0112549 A1 | 5/2012 | Perisic et al. | |
| 2012/0221208 A1 | 8/2012 | Kojo et al. | |
| 2013/0261896 A1 | 10/2013 | Gebregergis et al. | |
| 2014/0191699 A1 | 7/2014 | Dixon | |
| 2014/0239860 A1 | 8/2014 | Kleinau | |
| 2014/0265962 A1 | 9/2014 | Gebregergis et al. | |
| 2014/0375239 A1 * | 12/2014 | Kim et al. | 318/400.23 |

FOREIGN PATENT DOCUMENTS

| | | |
|---|---|---|
| CN | 101218146 A | 7/2008 |
| CN | 101399516 B | 4/2009 |
| CN | 101456429 A | 6/2009 |
| CN | 101981804 A | 2/2011 |
| EP | 2003010 A2 | 12/2008 |
| JP | 2000108916 A | 4/2000 |
| JP | 2001247049 A | 9/2001 |

OTHER PUBLICATIONS

European Search Report for related European Application No. 2196930.7, dated: Mar. 22, 2013, 7 pages.

L. Harnefors, et al., "Model-Based Current Control of AC Machines Using the Internal Model Control Method", IEEE Transactions on Industry Applications, vol. 34, No. 1, Jan./Feb. 1998, pp. 133-141.

J. Kirtley, "6.061 Introduction to Electric Power Systems, Class Notes Chapter 12 Permanent Magnet 'Brushless DC'" Motors, Massachussetts Institute of Technology, Department of Electrical Engineering and Computer Science, Spring 2011.

Chinese Office Action for Chinese Application No. 201210599015.5 dated Oct. 23, 2014; 29 pages.

Chinese Office Action for Chinese Patent Application No. 201310104183.7 issued on Jan. 6, 2015.

* cited by examiner

US 9,136,785 B2

MOTOR CONTROL SYSTEM TO COMPENSATE FOR TORQUE RIPPLE

BACKGROUND OF THE INVENTION

The present invention relates to a control system for a motor, and more particularly to a control system for a motor that determines a ripple compensating current.

The output torque of a permanent magnet synchronous motor (PMSM) (either a surface permanent magnet (SPM) or an interior permanent magnet (IPM) motor) may be determined by a voltage command and a phase advance angle. A specific output torque of the PMSM is determined by first selecting a specific quadrature axis (also referred to as the q-axis) reference current and a direct axis (also referred to as the d-axis) reference current, and then determining the voltage command and the phase advance angle based on the selected quadrature axis reference current and the direct axis reference current.

Interior permanent magnet synchronous motors (IPMSMs) are relatively inexpensive, but typically produce a relatively high torque ripple during operation Electric motors utilized in electric power steering (EPS) applications are generally required to produce relatively low torque ripple. Thus, the torque ripple produced by an IPMSM or an SPM may need to be reduced before being used in an EPS application.

SUMMARY OF THE INVENTION

In one embodiment, a motor control system is provided. The motor control system includes a motor having plurality of motor harmonics, and a torque ripple compensation controller in communication with the motor. The torque ripple compensation controller is configured to determine a harmonic ripple current for a corresponding one of the plurality of motor harmonics. The harmonic ripple current is based on a reference q-axis current and a reference d-axis current. The torque ripple compensation controller is configured to add the harmonic ripple current for each of the plurality of motor harmonics together to determine the ripple compensating current.

In another embodiment, a method of motor control for a motor having a plurality of motor harmonics is provided. The method includes determining a harmonic ripple current for a corresponding one of the plurality of motor harmonics by a torque ripple compensation controller. The harmonic ripple current is based on a reference q-axis current and a reference d-axis current. The method includes adding the harmonic ripple current for each of the plurality of motor harmonics together to determine the ripple compensating current.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
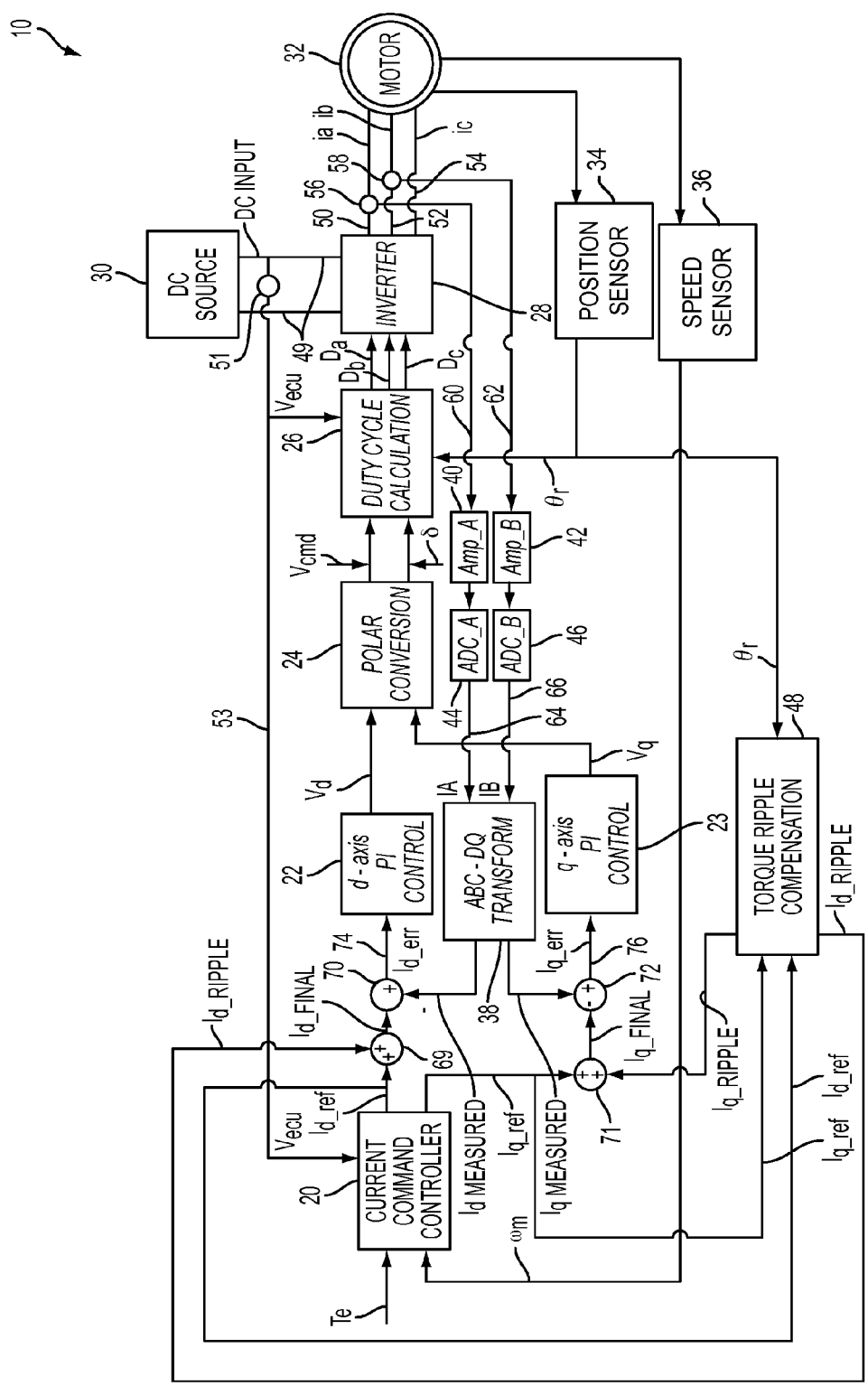
FIG. 1 is a block diagram of a motor control system in accordance with an exemplary embodiment of the invention.

Referring now to the Figures, where the invention will be described with reference to specific embodiments, without limiting same, FIG. 1 is an exemplary block diagram of a motor control system 10. The motor control system 10 includes a command current controller 20, a d-axis proportional plus integral gain (PI) controller 22, a q-axis PI controller 23, a polar conversion controller 24, a pulse width modulation (PWM) inverter controller 26, an inverter 28, a DC power source 30, a motor 32, a position sensor 34, a speed sensor 36, a transform controller 38, an a-axis current amplifier 40, a b-axis current amplifier 42, an a-axis analog to digital converter (ADC) 44, a b-axis ADC 46, and a torque ripple compensation controller 48. In one embodiment, the motor 32 may be an interior permanent magnet synchronous motor (IPMSM) or a surface permanent magnet synchronous motor (SPM), however it is to be understood that any type of electric motor that is controlled using phase current may be used as well.

In the embodiment as shown in FIG. 1, the inverter 28 is connected to the DC power source 30, where the DC power source 30 may be, for example, a battery. The DC power source 30 may be connected to the inverter 28 by DC input lines 49. A transducer 51 may be used to monitor a bridge voltage $V_{ecu}$ across the DC input lines 49. A control signal 53 representing the bridge voltage $V_{ecu}$ may be sent to the command current controller 20 and the PWM inverter controller 26. In the exemplary embodiment as shown, the inverter 26 transmits three alternating current (AC) phase currents to the motor 32 (e.g., $i_a$, $i_b$, and $i_c$) by line 50, line 52, and line 54 for operation and control of the motor 32.

For feedback control purposes, the phase currents $i_a$ and $i_b$ transmitted to the motor 32 by lines 50 and 52 may be detected to determine the instantaneous current flow to the motor 32. Specifically, a transducer 56 may be used to monitor the phase current $i_a$ on the line 50, and a transducer 58 may be used to monitor the phase current $i_b$ on the line 52. It should be noted that although transducer 56 and transducer 58 are illustrated, only one of the lines 50 or 52 may be monitored to measure either phase current $i_a$ or phase current $i_b$. A control signal 60 representing the measured phase current $i_a$ may be sent to the a-axis current amplifier 40 from the transducer 56, and a control signal 62 representing the measured phase current $i_b$ may be sent to the b-axis current amplifier 42 from the transducer 58. An augmented or amplified value of the phase current $i_a$ is then sent to the a-axis ADC 44 from the a-axis current amplifier 40, and an amplified value of the phase current $i_b$ 62 is sent to the b-axis ADC 46 from the b-axis current amplifier 42. The a-axis ADC 44 converts the amplified value of the phase current $i_a$ into a digital value 64. The digital value 64 represent the magnitude of the phase current $i_a$. The b-axis ADC 46 converts the amplified value of the phase current $i_b$ into a digital value 66. The digital value 66 represents the magnitude of the phase current $i_b$.

The transform controller 38 receives as input the digital value 64 from the ADC 44 and the digital value 66 from the ADC 46. In one embodiment, the transform controller 38 is a three-phase to two-phase transformation controller where measured values for the AC current (e.g., the digital value 64 representing the phase current $i_a$ and the digital value 66 representing the phase current $i_b$) are converted into equivalent measured currents, which are a measured d-axis current $I_{dMEASURED}$ and a measured q-axis current $I_{qMEASURED}$. The measured d-axis current $I_{dMEASURED}$ is sent to a subtractor 70 and the measured q-axis current $I_{qMEASURED}$ is sent to a subtractor 72.

The command current controller 20 receives as input a torque reference command $T_e$, an angular speed $\omega_m$, and the control signal 53 representing the bridge voltage $V_{ecu}$ from the transducer 51. The torque reference command $T_e$ represents a commanded torque value, and may be derived from another controller (not shown), or may correspond to a torque value generated by an operator. The angular speed $\omega_m$ is measured by the speed sensor 36. The speed sensor 36 may include, for example, an encoder and a speed calculation circuit for calculating the angular speed of a rotor (not shown) of the motor 32 based on a signal received by the encoder. The command current controller 20 calculates a reference d-axis current $I_{d\_REF}$ and a reference q-axis current $I_{q\_REF}$ based on the torque command $T_e$, the bridge voltage $V_{ecu}$, and the angular speed $\omega_m$. For example, in one embodiment, the reference d-axis current $I_{d\_REF}$ and the reference q-axis current $I_{q\_REF}$ may be calculated using a look-up table. However, it is understood other approaches may be used as well to determine the reference d-axis current $I_{d\_REF}$ and the reference q-axis current $I_{q\_REF}$. The reference d-axis current $I_{d\_REF}$ is sent to an adder 69 and the torque ripple compensation controller 48, and the reference q-axis current $I_{q\_REF}$ is sent to an adder 71 and the torque ripple compensation controller 48.

The torque ripple compensation controller 48 receives as input the reference d-axis current $I_{d\_REF}$ and the reference q-axis current $I_{q\_REF}$ from the command current controller 20 and a rotor angle value $\theta_r$ measured by the motor position sensor 34. The torque ripple compensation controller 48 determines a q-axis ripple compensating current $I_{q\_RIPPLE}$, a d-axis ripple compensating current $I_{d\_RIPPLE}$, or both the a q-axis ripple compensating current $I_{q\_RIPPLE}$ and the d-axis ripple compensating current $I_{d\_RIPPLE}$ based on the inputs, which is described in greater detail below. The q-axis ripple compensating current $I_{q\_RIPPLE}$ and the d-axis ripple compensating current $I_{d\_RIPPLE}$ generate a compensating torque ripple that is substantially equal in magnitude, but is in an opposite direction from a torque ripple generated by the motor 32 (e.g., at about a 180-degree shift).

The adder 69 receives the reference d-axis current $I_{d\_REF}$ and the d-axis ripple compensating current $I_{d\_RIPPLE}$. The adder 69 determines a d-axis final current $I_{d\_final}$ by adding the reference d-axis current $I_{d\_REF}$ and the d-axis ripple compensating current $I_{d\_RIPPLE}$ together. The d-axis final current $I_{d\_final}$ is then sent to the subtractor 70. The subtractor 70 receives the measured d-axis current $I_{dMEASURED}$ and the d-axis final current $I_{d\_final}$. The subtractor 70 determines a d-axis error signal 74 based on the measured d-axis current $I_{dMEASURED}$ and the reference d-axis final current $I_{d\_final}$. The d-axis error signal 74 represents the error between the measured d-axis current $I_{dMEASURED}$ and the d-axis final current $I_{d\_final}$.

The adder 71 receives the reference q-axis current $I_{q\_REF}$ and the q-axis ripple compensating current $I_{q\_RIPPLE}$. The adder 71 determines a q-axis final current $I_{q\_final}$ by adding the reference q-axis current $I_{q\_REF}$ and the q-axis ripple compensating current $I_{q\_RIPPLE}$ together. The q-axis final current $I_{q\_final}$ is then sent to the subtractor 72. The subtractor 72 receives the measured d-axis current $I_{dMEASURED}$ and the q-axis final current $I_{q\_final}$. The subtractor 72 then determines a q-axis error signal 76 based on the measured q-axis current $I_{qMEASURED}$ and the q-axis final current $I_{q\_final}$. The q-axis error signal 76 represents the error between the measured q-axis current $I_{qMEASURED}$ and the q-axis final current $I_{q\_final}$.

The d-axis PI controller 22 receives as input the d-axis error signal 74 from the subtractor 70. The d-axis PI controller 22 calculates a d-axis voltage signal $V_D$. The d-axis voltage signal $V_D$ is based on a d-axis proportional gain $K_P$, and a d-axis integral gain $K_i$. Likewise, the q-axis PI controller 23 receives as input the q-axis error signal 76 from the subtractor 72. The q-axis PI controller 23 calculates a q-axis voltage signal $V_Q$. The q-axis voltage signal $V_Q$ is based on a q-axis proportional gain $K_P$, and a q-axis integral gain $K_i$.

The polar conversion controller 24 receives as input the d-axis voltage signal $V_D$ from the d-axis PI controller 22 and the q-axis voltage signal $V_Q$ from the q-axis PI controller 23. Based on the inputs, the polar conversion controller 24 determines a voltage command $V_{cmd}$ and a phase advance angle $\delta$. The PWM inverter controller 26 receives as inputs the voltage command $V_{cmd}$ and the phase advance angle $\delta$ from the polar conversion controller 24. The PWM inverter controller 26 also receives the rotor angle value $\theta_r$ measured by the motor position sensor 34. In one exemplary embodiment, the PWM inverter controller 26 may include an over-modulation space vector PWM unit to generate three respective duty cycle values $D_a$, $D_b$, and $D_c$. The duty cycle values $D_a$, $D_b$, and $D_c$ are used to drive gate drive circuits (not shown) of the inverter 28 that energize phases of the of the motor 32.

Figure 2:
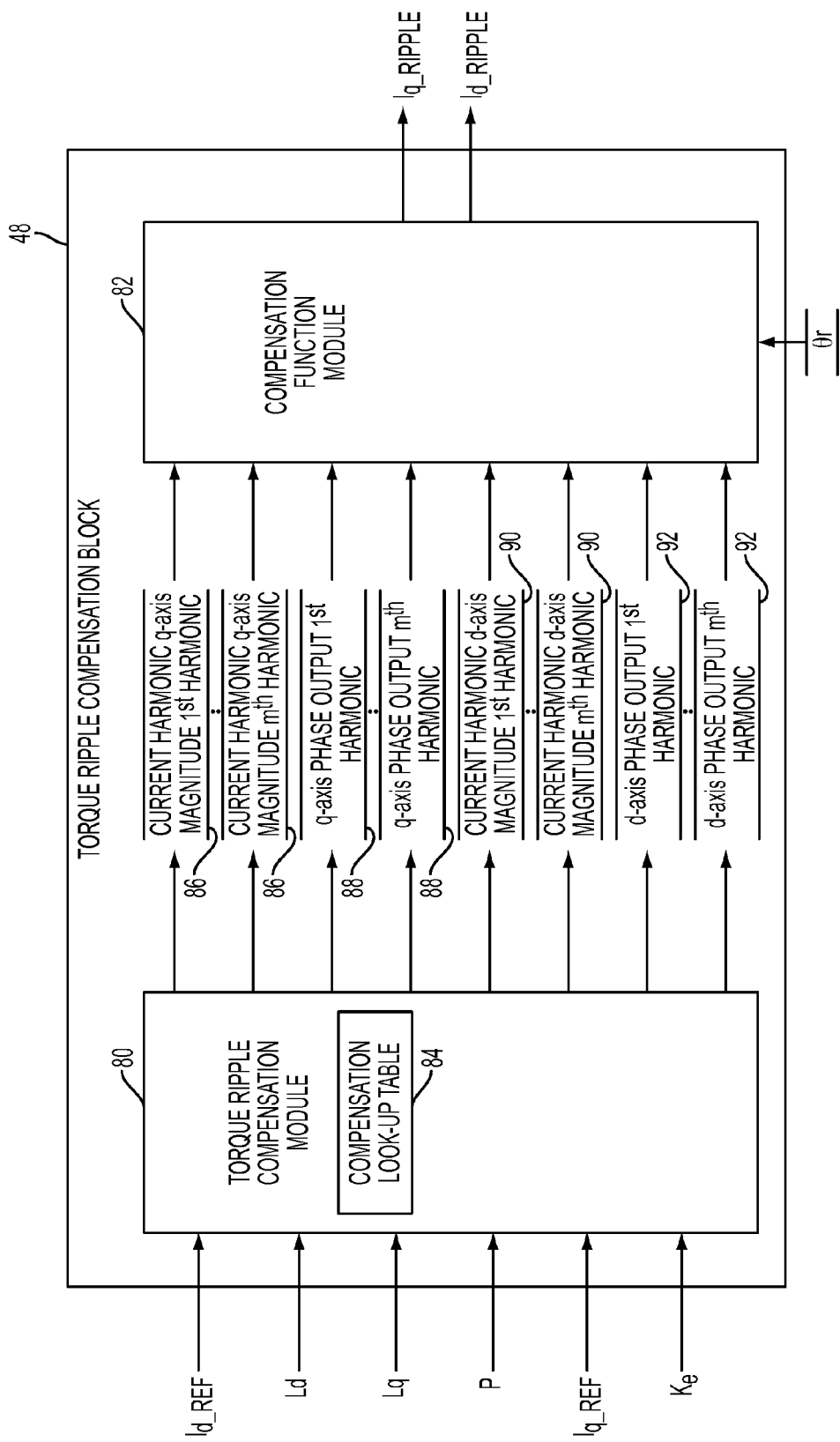
FIG. 2 is a dataflow diagram illustrating an exemplary torque ripple compensation controller, in accordance with another exemplary embodiment of the invention.

Determining the q-axis ripple current $I_{q\_RIPPLE}$ and the d-axis ripple compensating current $I_{d\_RIPPLE}$ by the torque ripple compensation controller 48 will now be described. Turning now to FIG. 2, a dataflow diagram illustrates an exemplary embodiment of the torque ripple compensation controller 48 of FIG. 1 used to determine the q-axis ripple current $I_{q\_RIPPLE}$ and the d-axis ripple compensating current $I_{d\_RIPPLE}$. In one example, the torque ripple compensation controller 48 includes a torque ripple compensation module 80 and a compensation function module 82. The torque ripple compensation controller 80 includes a set of compensation look-up tables 84. Each compensation look-up table 84 contains values for either a torque ripple magnitude or a torque ripple phase for a specific motor harmonic that are based on the reference d-axis current $I_{d\_REF}$ and the reference q-axis current $I_{q\_REF}$.

The torque ripple compensation module 80 receives as input the reference d-axis current $I_{d\_REF}$, the reference q-axis current $I_{q\_REF}$, the motor back-emf constant Ke (where emf is the electromotive force), a number of motor poles P of the motor 32, a q-axis inductance $L_q$, and a d-axis inductance $L_d$. In one alternative embodiment, the torque ripple compensation module may determine the values for the motor back-emf constant Ke, the number of motor pole P, the q-axis inductance $L_q$, and the d-axis inductance $L_d$.

The torque ripple compensation module 80 may first determine the torque ripple magnitude and the torque ripple phase for each motor harmonic using the compensation look-up tables 84. The compensation look-up tables 84 each contain specific values for either the torque ripple magnitude or the torque ripple phase for a specific motor harmonic. The values for the torque ripple magnitude or the torque ripple phase in each of the compensation look-up tables 84 are based on the reference d-axis current $I_{d\_REF}$ and the reference q-axis current $I_{q\_REF}$. For example, to determine the torque ripple magnitude for a specific motor harmonic (e.g., an eighth order motor harmonic), a look-up table is provided to determine the value of the torque ripple magnitude for the eighth order harmonic based on a specific value of the reference d-axis current $I_{d\_REF}$, the reference q-axis current $I_{q\_REF}$. Another look-up table is provided to determine the value of the torque ripple phase for the eighth order harmonic based on a specific value of the reference d-axis current $I_{d\_REF}$, the reference q-axis current $I_{q\_REF}$. In one embodiment, the values for the torque ripple magnitude and the torque ripple phase stored in the compensation look-up tables 84 may be adjusted based on specific cogging torque characteristics of the motor 32 (shown in FIG. 1).

Once the values for the torque ripple magnitude and the torque ripple phase for a specific motor harmonic are found in the compensation look-up tables 84, the torque ripple compensation module 80 may then calculate a current harmonic q-axis magnitude 86 and a current q-axis phase output 88 for the specific motor harmonic. Alternatively, or in addition to the current harmonic q-axis magnitude 86 and the current q-axis phase output 88, the torque ripple compensation module 80 may calculate a current harmonic d-axis magnitude 90 and a current d-axis phase output 92 for the specific motor harmonic. In one embodiment, the current harmonic q-axis magnitude 86 for a specific motor harmonic may be determined by either Equations 1 or 2, the current q-axis phase output 88 for a specific motor harmonic may be determined by Equation 3, the current harmonic d-axis magnitude 90 for a specific motor harmonic may be determined by Equation 4, and the current d-axis phase output 92 for a specific motor harmonic may be determined by Equation 5:

$$MtrCurrQax\_iMag = \frac{2}{\sqrt{3}} \frac{t\_MtrTrq\_ripple\_iMag(n)}{Ke} \quad \text{Equation 1}$$

$$MtrCurrQax\_iMag = \frac{t\_MtrTrq\_ripple\_iMag(n)}{\frac{\sqrt{3}}{2}Ke + \frac{3}{2}\frac{P}{2}(L_q - L_d) \cdot Id\_ref} \quad \text{Equation 2}$$

$$MtrCurrQax\_iPhase = sign(Iq\_ref) t\_MtrTrq\_ripple\_iPh(n) \quad \text{Equation 3}$$

$$MtrCurrDax\_iMag = \frac{t\_MtrTrq\_ripple\_iMag(n)}{\frac{3}{2}\frac{P}{2}(L_q - L_d) \cdot Iq\_ref} \quad \text{Equation 4}$$

$$MtrCurrDax\_iPhase = sign(Iq\_ref) t\_MtrTrq\_ripple\_iPh(n) \quad \text{Equation 5}$$

where MtrCurrQax_iMag is the current harmonic q-axis magnitude 86, t_MtrTrq_ripple_iMag(n) is the torque ripple magnitude found in one of the compensation look-up tables 84 for an $i^{th}$ harmonic (where i represents a specific harmonic such as, for example, the eighth harmonic), MtrCurrQax_iPhase is the current q-axis phase output 88, t_MtrTrq_ripple_iPh(n) is the torque ripple phase found in one of the compensation look-up tables 84 for the $i^{th}$ harmonic, MtrCurrDax_iMag is the current harmonic d-axis magnitude 90, and MtrCurrDax_iPhase is the current d-axis phase output 92.

The torque ripple compensation module 80 calculates the current harmonic q-axis magnitude 86 and the current q-axis phase output 88 for each motor harmonic. For example, as seen in FIG. 2, if there are an m number of motor harmonics, then the torque ripple compensation module 80 calculates the m number of values of the current harmonic q-axis magnitude 86 and an m number of values for the current q-axis phase output 88. Alternatively, or in addition to the current harmonic q-axis magnitude 86 and the current q-axis phase output 88, the torque ripple compensation module 80 calculates the current harmonic d-axis magnitude 90 and the current d-axis phase output 92 for each motor harmonic (e.g., the m number of motor harmonics).

The compensation function module 82 receives as input the values for the current harmonic q-axis magnitude 86 and the current q-axis phase output 88 for each of the m number of motor harmonics. Alternatively, or in addition to the current harmonic q-axis magnitude 86 and the current q-axis phase output 88 for each of the m number of motor harmonics, the compensation function module 82 may also receive the current harmonic d-axis magnitude 90 and the current d-axis phase output 92 for each of the m number of motor harmonics. The compensation function module 82 also receives the rotor angle value $\theta_r$ measured by the motor position sensor 34 (shown in FIG. 1). The compensation function module 82 may then determine the q-axis ripple compensating current $I_{q\_RIPPLE}$, the d-axis ripple compensating current $I_{d\_RIPPLE}$, or both the q-axis ripple compensating current $I_{q\_RIPPLE}$ and the d-axis ripple compensating current $I_{d\_RIPPLE}$ based on the inputs. Specifically, in one embodiment, the compensation function module 82 may determine the q-axis ripple compensating current $I_{q\_RIPPLE}$ using Equation 6 and the d-axis ripple current $I_{d\_RIPPLE}$ using Equation 7:

$$I_{q\_ripple} = \sum_{i=1}^{m} Ai \sin(i\theta_r + \phi i) \quad \text{Equation 6}$$

$$I_{d\_ripple} = \sum_{i=1}^{m} Ai \sin(i\theta_r + \phi i) \quad \text{Equation 7}$$

where Ai represents the $i^{th}$ harmonic of the current harmonic q-axis magnitude 86 or the current harmonic d-axis magnitude 90, and $\phi i$ represents the $i^{th}$ harmonic of the current q-axis phase output 88 or the current d-axis phase output 92.

The q-axis ripple compensating current $I_{q\_RIPPLE}$ is then sent to the adder 71 (shown in FIG. 1). The d-axis ripple compensating current $I_{d\_RIPPLE}$ is then sent to the adder 69 (shown in FIG. 1).

Figure 3:
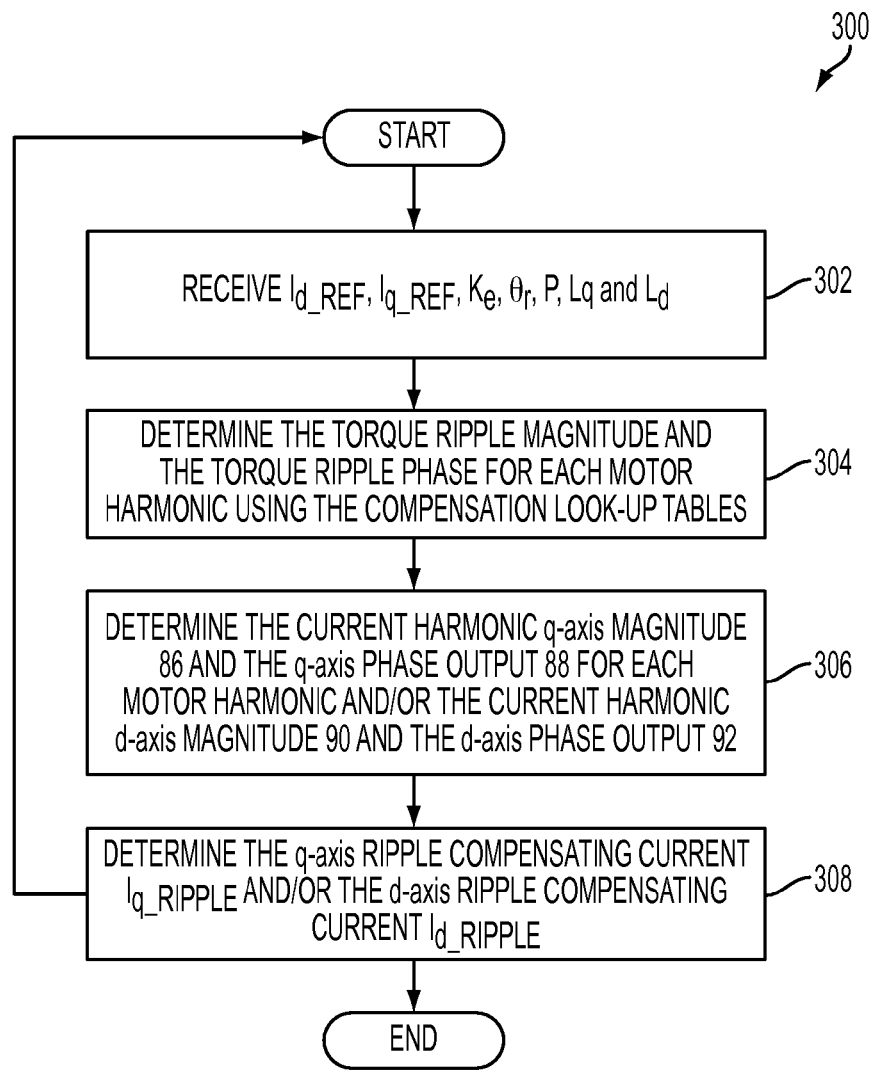
FIG. 3 is a process flow diagram for determining a ripple compensating current, in accordance with yet another exemplary embodiment of the invention.

FIG. 3 is an exemplary process flow diagram illustrating a method 300 for determining the q-axis ripple compensating current $I_{q\_RIPPLE}$ and the d-axis ripple compensating current $I_{d\_RIPPLE}$. Referring now to FIGS. 1-3, the method 300 may begin at block 302, where the torque ripple compensation module 80 receives as input the reference d-axis current $I_{d\_REF}$, the reference q-axis current $I_{q\_REF}$, the motor back-emf constant Ke, the rotor angle value $\theta_r$, the number of motor poles P, the q-axis inductance $L_q$, and the d-axis inductance $L_d$. In one embodiment, the torque compensation module 80 periodically determine the motor back-emf constant Ke, the rotor angle value $\theta_r$, the number of motor poles P, the q-axis inductance $L_q$, and the d-axis inductance $L_d$. Method 200 may then proceed to block 304.

In block 304, the torque ripple compensation module 80 determines the torque ripple magnitude and the torque ripple phase for each motor harmonic using the compensation look-up tables 84 based on the values of the reference d-axis current $I_{d\_REF}$ and the reference q-axis current $I_{q\_REF}$. Method 300 may then proceed to block 306.

In block 306, the torque ripple compensation module 80 may then calculate the current harmonic q-axis magnitude 86 and the current q-axis phase output 88 for each motor harmonic using Equations 1-3. Alternatively, or in addition to the current harmonic q-axis magnitude 86 and the current q-axis phase output 88, the torque ripple compensation module 80 determines the current harmonic d-axis magnitude 90 and the current d-axis phase output 92 for each motor harmonic using Equations 4-5. Method 300 may then proceed to block 308.

In block 308, the compensation function module 82 determines the q-axis ripple compensating current $I_{q\_RIPPLE}$ using Equation 6 (described above). Alternatively, or in addition to the $i^{th}$ harmonic q-axis ripple current $I_{q\_RIPPLE}$, the compensation function module 82 determines the d-axis ripple compensating current $I_{d\_RIPPLE}$ using Equation 7 (described above). Method 300 may then proceed to block 310. Method 200 may then repeat, or terminate.

The torque ripple compensation controller 48 as described above determines the q-axis ripple compensating current $I_{q\_RIPPLE}$, the d-axis ripple compensating current $I_{d\_RIPPLE}$, or both the q-axis ripple compensating current $I_{q\_RIPPLE}$ and the d-axis ripple compensating current $I_{d\_RIPPLE}$. The q-axis ripple compensating current $I_{q\_RIPPLE}$ and the d-axis ripple compensating current $I_{d\_RIPPLE}$ generally compensate for torque ripple created during operation of the motor 32, as well as cogging torque created by mechanical characteristics of the motor 32. Specifically, the q-axis ripple compensating current $I_{q\_RIPPLE}$ and the d-axis ripple compensating current $I_{d\_RIPPLE}$ generate a compensating torque ripple that is substantially equal in magnitude, but is in an opposite direction from the torque ripple generated by the motor 32, which generally cancels torque ripple.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A motor control system, comprising:
a motor having plurality of motor harmonics; and
a torque ripple compensation controller in communication with the motor, the torque ripple compensation controller configured to:
determine a harmonic ripple current for each of the plurality of motor harmonics based on a reference q-axis current and a reference d-axis current; and
add the plurality of harmonic ripple currents together to determine a ripple compensating current that is used to remove the plurality of harmonic ripple currents from the reference q-axis current and the reference d-axis current.

2. The motor control system of claim 1, wherein the torque ripple compensation controller includes a plurality of look-up tables, wherein each of the plurality of look-up tables are used to determine one of a torque ripple magnitude and a torque ripple phase for one of the plurality of motor harmonics.

3. A motor control system, comprising:
a motor having plurality of motor harmonics; and
a torque ripple compensation controller in communication with the motor, the torque ripple compensation controller configured to:
determine a harmonic ripple current for a corresponding one of the plurality of motor harmonics, the harmonic ripple current based on a reference q-axis current and a reference d-axis current; and
add the harmonic ripple current for each of the plurality of motor harmonics together to determine a ripple compensating current,
wherein the torque ripple compensation controller includes a plurality of look-up tables, wherein each of the plurality of look-up tables are used to determine one of a torque ripple magnitude and a torque ripple phase for one of the plurality of motor harmonics,
wherein values for the torque ripple magnitude and the torque ripple phase are based on cogging torque characteristics of the motor.

4. The motor control system of claim 2, wherein the torque ripple compensation controller calculates a current harmonic q-axis magnitude based on the torque ripple magnitude.

5. The motor control system of claim 2, wherein the torque ripple compensation controller calculates a current q-axis phase output based on the torque ripple phase.

6. A motor control system, comprising:
a motor having plurality of motor harmonics; and
a torque ripple compensation controller in communication with the motor, the torque ripple compensation controller configured to:
determine a harmonic ripple current for a corresponding one of the plurality of motor harmonics, the harmonic ripple current based on a reference q-axis current and a reference d-axis current; and
add the harmonic ripple current for each of the plurality of motor harmonics together to determine a ripple compensating current,
wherein the torque ripple compensation controller includes a plurality of look-up tables, wherein each of the plurality of look-up tables are used to determine one of a torque ripple magnitude and a torque ripple phase for one of the plurality of motor harmonics,
wherein the torque ripple compensation controller calculates a current q-axis phase output based on the torque ripple phase,
wherein the current q-axis phase output is determined by:

$$\text{MtrCurrQax\_}i\text{Phase} = \text{sign}(\text{Iq\_ref})t\_\text{MtrTrq\_ripple\_}i\text{Ph}(n)$$

wherein MtrCurrQax_iPhase is the current q-axis phase output, Iq_ref is the reference q-axis current, and t_MtrTrq_ripple_iPh(n) is the torque ripple phase found in one of the plurality of look-up tables for an $i^{th}$ harmonic.

7. The motor control system of claim 2, wherein the torque ripple compensation controller calculates a current harmonic d-axis magnitude based on the torque ripple magnitude.

8. The motor control system of claim 2, wherein the torque ripple compensation controller calculates a current d-axis phase output based on the torque ripple phase.

9. A motor control system, comprising:
a motor having plurality of motor harmonics; and
a torque ripple compensation controller in communication with the motor, the torque ripple compensation controller configured to:
determine a harmonic ripple current for a corresponding one of the plurality of motor harmonics, the harmonic ripple current based on a reference q-axis current and a reference d-axis current; and
add the harmonic ripple current for each of the plurality of motor harmonics together to determine a ripple compensating current,
wherein the ripple compensating current is a q-axis ripple compensating current, and determined by:

$$I_{q\_ripple} = \sum_{i=1}^{m} Ai\sin(i\theta_r + \phi i)$$

wherein $I_{q\_RIPPLE}$ is the q-axis ripple compensating current, Ai represents an $i^{th}$ harmonic of a current harmonic q-axis magnitude, $\theta_r$ is a rotor angle of the motor, and $\phi$i represents an $i^{th}$ harmonic of a current q-axis phase output.

10. A motor control system, comprising
a motor having plurality of motor harmonics; and
a torque ripple compensation controller in communication with the motor, the torque ripple compensation controller configured to:
determine a harmonic ripple current for a corresponding one of the plurality of motor harmonics, the harmonic ripple current based on a reference q-axis current and a reference d-axis current; and
add the harmonic ripple current for each of the plurality of motor harmonics together to determine a ripple compensating current,
wherein the ripple compensating current is a d-axis ripple compensating current, and determined by:

$$I_{d\_ripple} = \sum_{i=1}^{m} Ai\sin(i\theta_r + \phi i)$$

wherein $I_{d\_RIPPLE}$ is the d-axis ripple compensating current, Ai represents an $i^{th}$ harmonic of a current harmonic d-axis magnitude, $\theta_r$ is a rotor angle of the motor, and $\phi$i represents an $i^{th}$ harmonic of a current d-axis phase output.

11. A method of motor control for a motor having a plurality of motor harmonics, comprising:
determining a harmonic ripple current for each of the plurality of motor harmonics by a torque ripple compensation controller based on a reference q-axis current and a reference d-axis current; and
adding the plurality of harmonic ripple currents together to determine a ripple compensating current that is used to remove the plurality of harmonic ripple currents from the reference q-axis current and the reference d-axis current.

12. The method of claim 11, further comprising including a plurality of look-up tables with the torque ripple compensation controller, wherein each of the plurality of look-up tables are used to determine one of a torque ripple magnitude and a torque ripple phase for one of the plurality of motor harmonics.

13. A method of motor control for a motor having a plurality of motor harmonics, comprising:
determining a harmonic ripple current for a corresponding one of the plurality of motor harmonics by a torque ripple compensation controller, the harmonic ripple current based on a reference q-axis current and a reference d-axis current;
adding the harmonic ripple current for each of the plurality of motor harmonics together to determine a ripple compensating current; and
including a plurality of look-up tables with the torque ripple compensation controller, wherein each of the plurality of look-up tables are used to determine one of a torque ripple magnitude and a torque ripple phase for one of the plurality of motor harmonics,
wherein values for the torque ripple magnitude and the torque ripple phase are based on cogging torque characteristics of the motor.

14. The method of claim 12, further comprising calculating a current harmonic q-axis magnitude by the torque ripple compensation controller based on the torque ripple magnitude.

15. The method of claim 12, further comprising calculating a current q-axis phase output by the torque ripple compensation controller based on the torque ripple phase.

16. A method of motor control for a motor having a plurality of motor harmonics, comprising:
determining a harmonic ripple current for a corresponding one of the plurality of motor harmonics by a torque ripple compensation controller, the harmonic ripple current based on a reference q-axis current and a reference d-axis current;
adding the harmonic ripple current for each of the plurality of motor harmonics together to determine a ripple compensating current; and
including a plurality of look-up tables with the torque ripple compensation controller, wherein each of the plurality of look-up tables are used to determine one of a torque ripple magnitude and a torque ripple phase for one of the plurality of motor harmonics,
wherein a harmonic ripple current is a harmonic q-axis ripple current, and determined by:

MtrCurrQax_iPhase=sign(Iq_ref)t_MtrTrq_ripple_iPh(n)

wherein MtrCurrQax_iPhase is the current q-axis phase output, Iq_ref is the reference q-axis current, and t_MtrTrqripple_iPh(n) is the torque ripple phase found in one of the plurality of look-up tables for an $i^{th}$ harmonic.

17. The method of claim 12, wherein the torque ripple compensation controller calculates a current harmonic d-axis magnitude based on the torque ripple magnitude.

18. The method of claim 12, wherein the torque ripple compensation controller calculates a current d-axis phase output based on the torque ripple phase.

19. A method of motor control for a motor having a plurality of motor harmonics, comprising:
determining a harmonic ripple current for a corresponding one of the plurality of motor harmonics by a torque ripple compensation controller, the harmonic ripple current based on a reference q-axis current and a reference d-axis current; and
adding the harmonic ripple current for each of the plurality of motor harmonics together to determine a ripple compensating current,
wherein the ripple compensating current is a q-axis ripple compensating current, and determined by:

$$I_{q\_ripple} = \sum_{i=1}^{m} Ai\sin(i\theta_r + \phi i)$$

wherein $I_{q\_RIPPLE}$ is the q-axis ripple compensating current, Ai represents an $i^{th}$ harmonic of a current harmonic q-axis magnitude, $\theta_r$ is a rotor angle of the motor, and $\phi$i represents an $i^{th}$ harmonic of a current q-axis phase output.

20. A method of motor control for a motor having a plurality of motor harmonics, comprising:
determining a harmonic ripple current for a corresponding one of the plurality of motor harmonics by a torque ripple compensation controller, the harmonic ripple current based on a reference q-axis current and a reference d-axis current; and
adding the harmonic ripple current for each of the plurality of motor harmonics together to determine a ripple compensating current, wherein the ripple compensating current is a d-axis ripple compensating current, and determined by:

$$I_{d\_ripple} = \sum_{i=1}^{m} Ai\sin(i\theta_r + \phi i)$$

wherein $I_{d\_RIPPLE}$ is the d-axis ripple compensating current, Ai represents an $i^{th}$ harmonic of a current harmonic d-axis magnitude, $\theta_r$ is a rotor angle of the motor, and $\phi i$ represents an $i^{th}$ harmonic of a current d-axis phase output.

* * * * *